(12) United States Patent
Jung et al.

(10) Patent No.: US 11,966,631 B2
(45) Date of Patent: Apr. 23, 2024

(54) COMMAND QUEUE ORDER ADJUSTMENT IN A DATA STORAGE DEVICE

(71) Applicant: Western Digital Technologies, Inc., San Jose, CA (US)

(72) Inventors: Sang Yun Jung, YongIn (KR); Min Woo Lee, Hwasung (KR); Min Young Kim, Suwon (KR)

(73) Assignee: Western Digital Technologies, Inc., San Jose, CA (US)

( * ) Notice: Subject to any disclaimer, the term of this patent is extended or adjusted under 35 U.S.C. 154(b) by 92 days.

(21) Appl. No.: 17/232,888

(22) Filed: Apr. 16, 2021

(65) Prior Publication Data

US 2022/0334765 A1     Oct. 20, 2022

(51) Int. Cl.
    *G06F 3/06*           (2006.01)
    *G06F 12/06*         (2006.01)

(52) U.S. Cl.
    CPC .......... *G06F 3/0659* (2013.01); *G06F 3/0604* (2013.01); *G06F 3/0673* (2013.01); *G06F 12/06* (2013.01); *G06F 2212/1016* (2013.01)

(58) Field of Classification Search
    CPC .... G06F 3/0604; G06F 3/0659; G06F 3/0673; G06F 12/06; G06F 2212/1016;
(Continued)

(56) References Cited

U.S. PATENT DOCUMENTS 5,642,492 A * 6/1997 Iizuka .................. G11B 27/034
                                            360/39
5,974,015 A * 10/1999 Iizuka .................. H04N 5/9206
                                         386/E5.013

(Continued)

FOREIGN PATENT DOCUMENTS

CN      101667284 B   *   6/2013          G06F 9/30076
CN      103403681 A   *   11/2013         G06F 3/0613
(Continued)

OTHER PUBLICATIONS

Machine Translation of CN 106339326A, provided by Espace.net. (Year: 2017).*

(Continued)

*Primary Examiner* — Reginald G Bragdon
*Assistant Examiner* — Aaron D Ho
(74) *Attorney, Agent, or Firm* — PATTERSON + SHERIDAN, LLP

(57) ABSTRACT

A method and system for maintaining command queue order are disclosed. According to certain embodiments, commands are read from a host, storing command queue IDs in an array that will keep the queue IDs in order. After having the queue IDs stored in the array, the commands are processed in the data storage device (DSD). After processing, the commands are provided to a completion order adjustment module that will order the commands in queue ID order for sequential commands to be returned to the host. In certain embodiments, for a sequential command, other commands of the same sequence are searched for the array and ordered with the sequential command. If a particular command of the sequence is not found, the completion order adjustment module will wait to transfer the sequence until each command of the sequence is found. For commands not part of a sequence, these commands are transferred to the host.

20 Claims, 8 Drawing Sheets

(58) Field of Classification Search
CPC ........ G06F 7/78; G06F 9/3834; G06F 9/3836; G06F 9/3842; G06F 9/3855; G06F 9/3857
USPC .................................. 711/154; 710/6, 52, 54
See application file for complete search history.

(56) References Cited

U.S. PATENT DOCUMENTS

| | | | |
|---|---|---|---|
| 6,112,265 A | 8/2000 | Harriman et al. | |
| 7,783,779 B1* | 8/2010 | Scales ................... | G06F 9/5077 718/1 |
| 7,904,614 B1* | 3/2011 | Marshall ................. | G06F 13/28 710/28 |
| 8,301,827 B2 | 10/2012 | Yeh | |
| 9,135,192 B2 | 9/2015 | Lin et al. | |
| 9,367,347 B1* | 6/2016 | Zhu ......................... | G06F 12/00 |
| 9,977,623 B2 | 5/2018 | Jean et al. | |
| 10,811,103 B2 | 10/2020 | Kim | |
| 2009/0063725 A1* | 3/2009 | Zhang ..................... | G06F 13/32 710/22 |
| 2011/0161554 A1* | 6/2011 | Selinger .............. | G06F 13/1668 711/E12.001 |
| 2011/0185159 A1* | 7/2011 | Bishop .................. | G06F 9/3855 712/E9.033 |
| 2014/0164444 A1* | 6/2014 | Bowen .................... | G06F 16/11 707/821 |
| 2016/0088082 A1* | 3/2016 | Sundararajan ...... | G06F 11/2071 709/212 |
| 2018/0349145 A1* | 12/2018 | Tye .......................... | G06F 9/544 |
| 2020/0089414 A1* | 3/2020 | Kojima ................. | G06F 3/0679 |
| 2020/0104056 A1* | 4/2020 | Benisty ................. | G06F 3/0688 |
| 2020/0242037 A1* | 7/2020 | Navon ................... | G06F 9/3832 |
| 2020/0310682 A1* | 10/2020 | Benisty ............... | G06F 13/1642 |
| 2020/0371940 A1* | 11/2020 | Navon ................. | G06F 12/0868 |
| 2021/0042045 A1* | 2/2021 | Tatara ................... | G06F 3/0653 |
| 2021/0174224 A1* | 6/2021 | Sharon ................. | G06F 3/0613 |
| 2021/0303206 A1* | 9/2021 | Saxena ................. | G06F 3/0604 |

FOREIGN PATENT DOCUMENTS

| | | | | | |
|---|---|---|---|---|---|
| EP | 2320325 | A1 * | 5/2011 | ............. | G06F 13/28 |
| JP | H05225071 | A * | 9/1993 | ............. | G06F 12/16 |
| JP | 2002023962 | A * | 1/2002 | | |

OTHER PUBLICATIONS

Machine translation of EP-2320325-A1 (Year: 2011).*
Machine translation of CN-103403681-A (Year: 2013).*
Machine translation of JP-H05225071-A (Year: 1993).*
Machine translation of CN-101667284-B (Year: 2013).*
Machine Translation of JP-200203962-A (Year: 2002).*

* cited by examiner

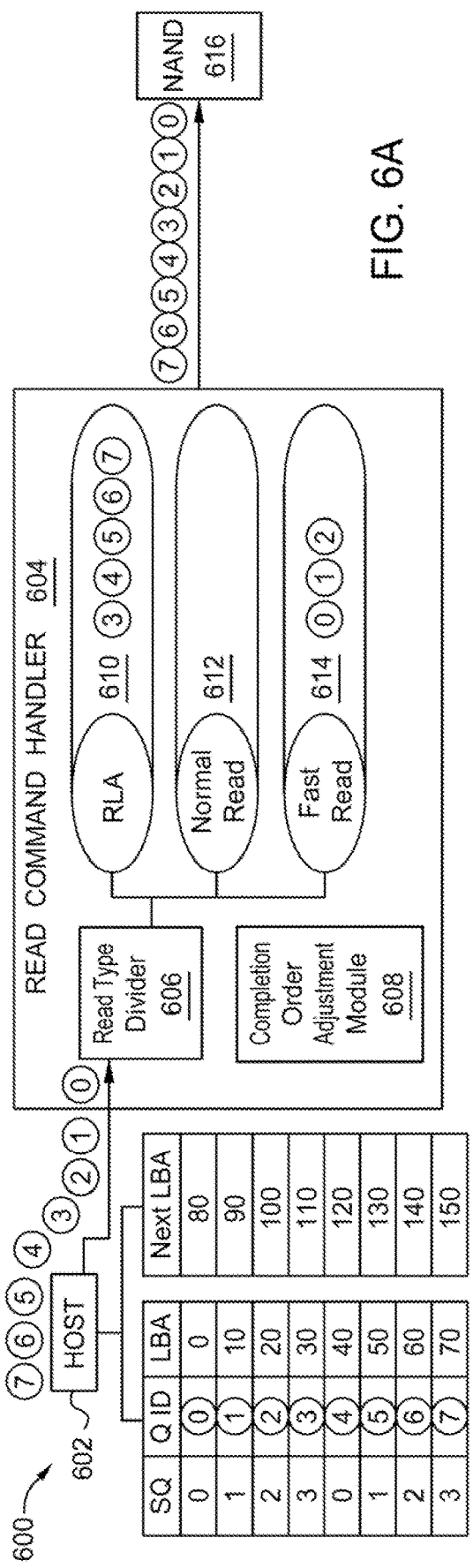
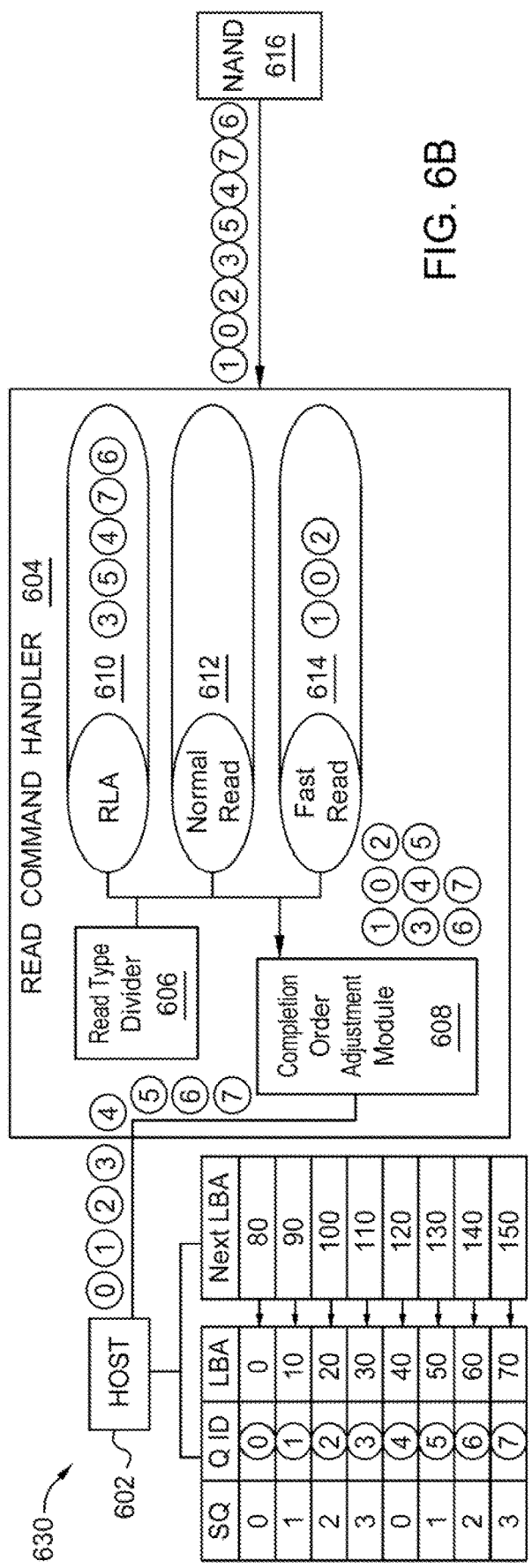

COMMAND QUEUE ORDER ADJUSTMENT IN A DATA STORAGE DEVICE

BACKGROUND OF THE DISCLOSURE

Field of the Disclosure

Embodiments of the present disclosure generally relate to command queues for a data storage device, and more particularly, to ordering of command queues for a data storage device.

Description of the Related Art

Many host system firmware designs are capable of tracking queued command completion and reuse of queue slots in accordance with the completion order of queued command completion by a data storage device. In this context, the host system maintains an application command workload pattern even when the data storage device executes and reorders queued commands.

However, certain host system firmware designs manage command queue workload patterns depending on the behavior of the data storage device. If the data storage device executes some commands in a sequential manner, such as with read look ahead (RLA) and others in a random pattern, such as with normal read or fast read, the host reorders the command queue according to an internal algorithm. As a result, commands that may previously have been processed sequentially with RLA are increasingly transitioned to normal read or fast read modes over time, degrading performance in the data storage device.

What is needed are systems and methods to reorder commands in the data storage device to maintain RLA command execution.

SUMMARY OF THE DISCLOSURE

The present disclosure generally relates to systems and methods for maintaining command queue ordering. According to certain embodiments, commands are read from a host, storing command queue IDs in an array that will keep the queue IDs in order. After having the queue IDs stored in the array, the commands are processed in the data storage device (DSD). After processing, the commands are provided to a completion order adjustment module that will order the commands in queue ID order for sequential commands, to be returned to the host. In certain embodiments, for a sequential command, other commands of the same sequence are searched for the array and ordered with the sequential command. If a particular command of the sequence is not found, the completion order adjustment module will wait to transfer the sequence until each command of the sequence is found. For commands not part of a sequence, these commands are transferred to the host.

In one embodiment, a data storage device includes a controller including computer-readable instructions that when executed by the controller, cause the controller to execute a method for command queue order adjustment that includes read a first command comprising a first queue ID and a second command comprising a second queue ID from a host, provide the first queue ID and second queue ID to an array of a completion order adjustment module, provide the first command and second command to a controller for processing, and generate a first processed command and second processed command. The method further includes receive the first processed command at the completion order adjustment module and determine if the first processed command is part of a logical block address (LBA) sequence of commands.

In another embodiment, a controller for a data storage device that includes an I/O to one or more memory devices comprising computer-readable instructions, and a processor coupled to the one or more memory devices configured to execute the computer-readable instructions and cause the controller to perform a method for command queue order adjustment in a data storage device. According to certain embodiments the method includes receive a first completed command having a first queue ID and a second completed command having a second queue ID at a completion order adjustment module comprising a search module, and determine if the first completed command and second completed command are sequential commands.

In another embodiment, a system for storing data is disclosed that includes one or more memory means, and a controller means configured to perform a method for command queue order adjustment in a data storage device. The method includes provide a first queue ID of a first command and a second queue ID of a second command to a searchable data structure, determine if the first command and second command are sequential commands, and transfer the first command to a host.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 6A-6C depict a read command handler generating a sequential read flow, according to certain embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, a reference to "the disclosure" shall not be construed as a generalization of any inventive subject matter disclosed herein and shall not be considered to be an element or limitation of the appended claims except where explicitly recited in a claim(s).

The present disclosure generally relates to systems and methods for maintaining command queue order. According to certain embodiments, commands are read from a host, storing command queue IDs in an array that will keep the queue IDs in order. After having the queue IDs stored in the array, the commands are processed in the data storage device (DSD). After processing, the commands are provided to a completion order adjustment module that will order the commands in queue ID order for sequential commands to be returned to the host. In certain embodiments, for a sequential command, other commands of the same sequence are searched for the array and ordered with the sequential command. If a particular command of the sequence is not found, the completion order adjustment module will wait to transfer the sequence until each command of the sequence is found. For commands not part of a sequence, these commands are transferred to the host.

Figure 1:
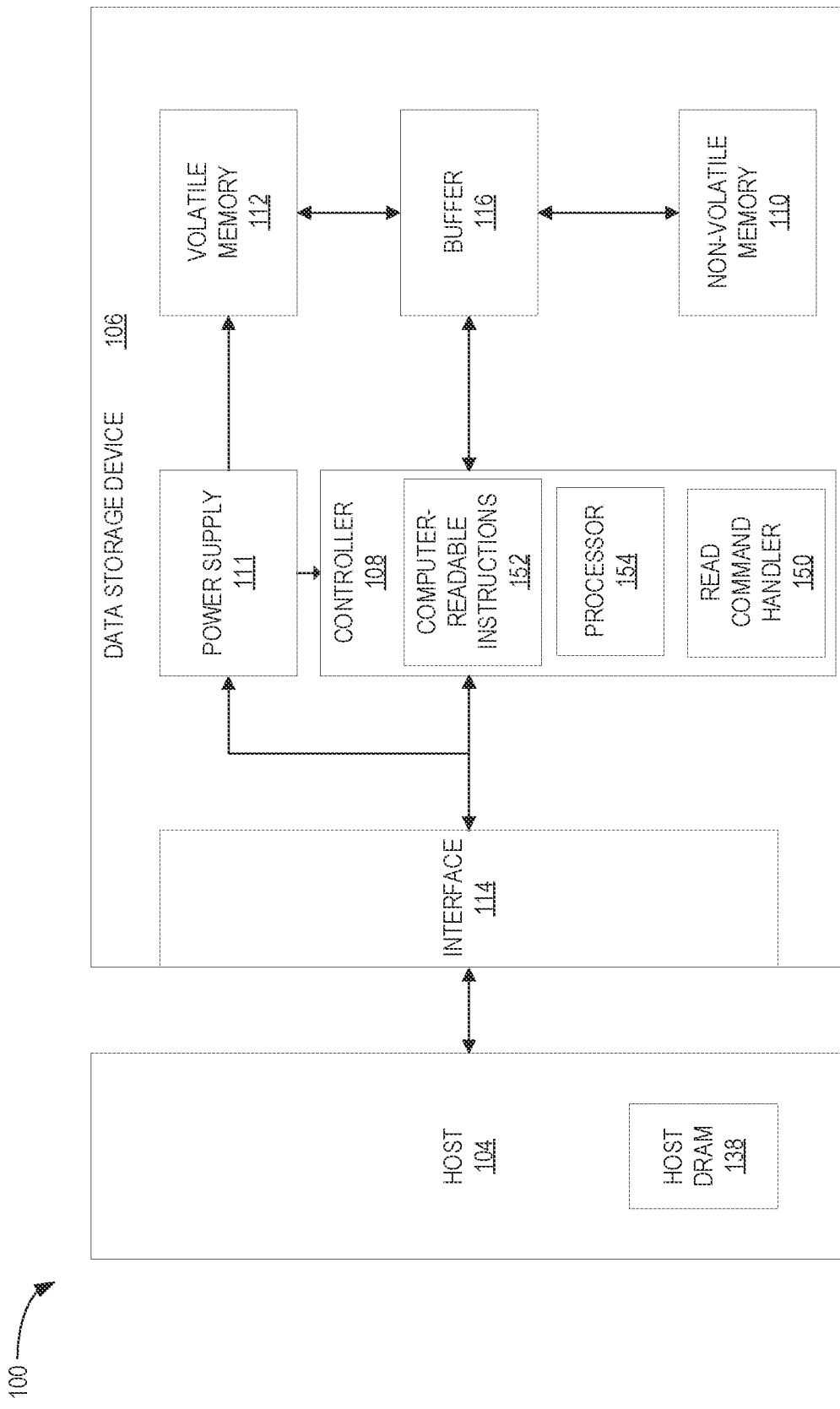
FIG. 1 depicts a schematic block diagram illustrating a storage system in which a data storage device may function as a storage device for a host device, according to certain embodiments.

FIG. 1 depicts a schematic block diagram illustrating a storage system 100 in which data storage device 106 may function as a storage device for a host device 104, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, an interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered) to a motherboard of the host device 104.

The interface 114 of the data storage device 106 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. The electrical connection of the interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit of NVM 110 may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit of NVM 110 may include any type of non-volatile memory devices, such as flash memory devices, phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). Controller 108 may write data to and read data from NVM flash memory devices at the page level and erase data from NVM flash memory devices at the block level.

The data storage device 106 includes a power supply 111, which may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, supercapacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The data storage device 106 also includes volatile memory 112, which may be used by controller 108 to store information. Volatile memory 112 may include one or more volatile memory devices. In some examples, controller 108 may use volatile memory 112 as a cache via an I/O. For instance, controller 108 may store cached information in volatile memory 112 until cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

The data storage device 106 includes a controller 108, which may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store the at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

Controller 108 includes a read command handler 150, computer-readable instructions 152, and a processor 154. The read command handler 150 may be configured to receive a plurality of read commands and split the plurality of read commands by a read type. For example, the plurality of read commands may be divided into a random read and a sequential read based on a logical block address (LBA) continuity and chunk size. After dividing the plurality of read commands into each respective read type, the read commands are serviced.

Figure 2:
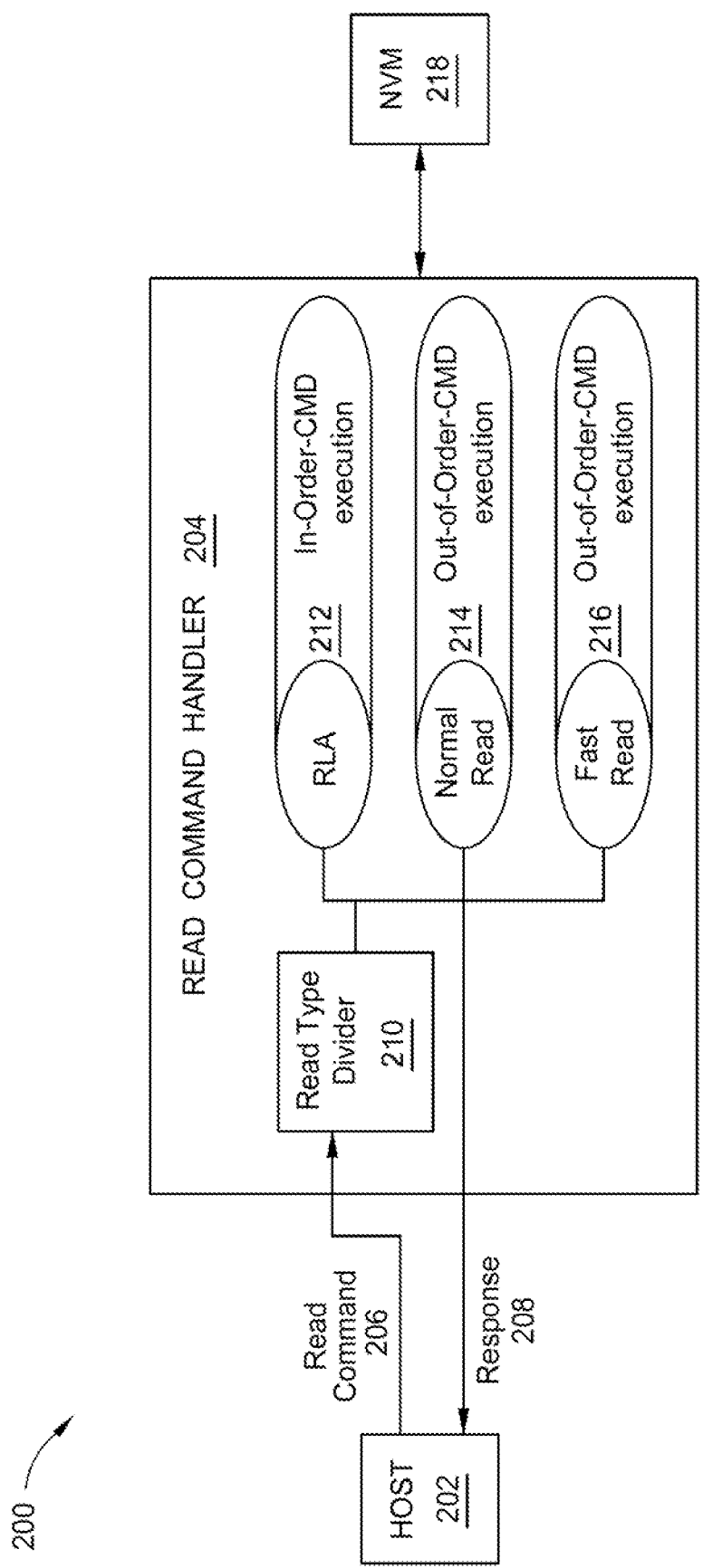
FIG. 2 depicts a schematic block diagram illustrating a read command handler interacting with a host device and an NVM, according to certain embodiments.

FIG. 2 depicts a schematic block diagram 200 illustrating a read command handler 204 interacting with a host device 202 and an NVM 218, according to certain embodiments. Aspects of the storage system 100 of FIG. 1 may be similar to the aspects described in FIG. 2. For example, the host device 202 may be the host device 104, the read command handler 204 may be the read command handler 150, and the NVM 218 may be the NVM 110. The host device 202 sends one or more read commands via an ingress bus 206 to a read type divider 210 of the read command handler 204. The read type divider 210 passes through the received one or more read commands and splits the one or more read commands based on a read type or command type. As stated previously, the read type or command type may be based on an LBA continuity and chunk size, such that the one or more read commands are divided into either a random read type or a sequential read type.

Each read type is associated with a performance matrix. For example, a read look ahead (RLA) 212 corresponds with a sequential read and in-order command execution, a normal read 214 corresponds with a random read with a large chunk size and an out-of-order command execution, and a fast read 216 corresponds with a random read with a small chunk size and an out-of-order command execution.

Because sequential read performance may be faster or better than non-sequential read performance, the RLA 212 performance is greater than the normal read 214 performance and the fast read 216 performance. The performance of the RLA 212 may be due to utilizing a pre-fetch/load from the NVM 218 mechanism before receiving the next LBA read command. Otherwise, the fast read 216 performance may be greater than the performance of the normal read 214. A command response is sent back to the host device 202 via an egress bus 208 after the commands are parsed, divided, and executed.

FIG. 3A depicts a first schematic block diagram 300 illustrating a data storage device 306 using a conventional approach to handling read commands, according to certain embodiments. FIG. 3B depicts a second schematic block diagram 350 illustrating a data storage device 352 using a completion order adjustment module 354 to handle an ordering of read commands, according to certain embodiments. The first schematic block diagram 300 and the second schematic block diagram 350 illustrates returning or sending back a command response to a host device 302, such as the host device 202 of FIG. 2. The data storage devices 306, 352 each include a data transfer block 308, an RLA—physical storage (PS) Job Done (interrupt service routine (ISR)) module 316, a fast read—PS Job Done (ISR) module 318, and a normal read—PS Job Done (ISR) module 320. The RLA—physical set (PS) Job Done (ISR) module may be referred to as the RLA ISR 316, the fast read—PS Job Done (ISR) module 318 may be referred to as the fast read ISR 318, and the normal read—PS Job Done (ISR) module 320 may be referred to as the normal read ISR 320, for simplification.

Referring to FIG. 3A, the data storage device 306 further includes an RLA handler 310 coupled to the RLA ISR 316, a fast read handler 312 coupled to the fast read ISR 318, and a normal read handler 314 coupled to the normal read ISR 320. The RLA handler 310, the fast read handler 312, and the normal read handler 314 are each coupled to the data transfer block 308, which sends data, including interrupts, to the host 302 via a data egress bus 304.

Referring to FIG. 3B, rather than including the RLA handler 310, the fast read handler 312, and the normal read handler 314 as shown in the data storage device 306, the data storage device 352 includes a completion order adjustment module 354. The completion order adjustment module 354 includes a search module 356, an array of RLA ready 358, a fast read buffer 360, a normal read buffer 362, and an RLA/fast read/normal read host transfer done (ISR) module 364. In some examples, the fast read buffer 360 and the normal read buffer 362 are array-type buffers. The array of RLA ready 358 is coupled to the RLA ISR 316, the fast read buffer 360 is coupled to the fast read ISR 318, and the normal read buffer 362 is coupled to the normal read ISR 320. The array of RLA ready 358, the fast read buffer 360, the normal read buffer, and the RLA/fast read/normal read host transfer done (ISR) 364 are coupled to the search module 356.

When the RLA ISR 316, the fast read ISR 318, and the normal read ISR 320 retrieves the data of the read command and generates an interrupt, the data and the interrupt are sent to the array of RLA ready 358, the fast read buffer 360, and the normal read buffer 362, respectively. The search module 356 may parse through the array of RLA ready 358, the fast read buffer 360, and the normal read buffer after receiving an indication from the RLA/fast read/normal read host transfer done (ISR) 364. The search module 356 may rearrange data and interrupts in a specific order to send to the data transfer block 308 to be returned to the host 302. For example, the data and interrupts may be reordered such that the data are returned to the host device 302 in a sequential or continuous LBA order even if the original read commands were executed or processed in a non-sequential manner. When the same read commands are generated by the host device 302 and sent to the data storage device 352, the read commands may be stored in an RLA module, such as the RLA 212, due to the continuity of the read command LBAs.

In one non-limiting example, the host device 302 sends a first command with a first queue ID, a second command with a second queue ID, a third command with a third queue ID, a fourth command with a fourth queue ID, and a fifth command with a fifth queue ID. The commands are provided to a read type divider, such as the read type divider 210 of FIG. 2. The read type divider 210 parses through the received commands and allocates the commands to the relevant read modules. For example, the first command, the second command, and the third command, along with each respective queue ID, are a random read with a short chunk size and are provided a fast read module, such as the fast read 216 of FIG. 2. The fourth command and the fifth command, along with each respective queue ID, are sequential read due to an LBA continuity and are provided to an RLA, such as the RLA 212 of FIG. 2.

Because the fast read 216 is an out-of-order command execution, the second command may be processed before processing the first command even though the first command was received first and has an LBA that is before the LBA of the second command. A processed command is generated for each of the received commands. The processed commands are sent to and received by the completion order adjustment module 354. The completion order adjustment module 354 reorders the processed commands such that the first processed command corresponding to the first command is sent before the second processed command corresponding to the second command. Without reordering the processed commands, the second processed command may be sent prior to the first processed command back to the host device 302. Thus, a non-sequential command may be sent to the data storage device in a subsequent operation, and more commands may be recognized as a "random read" rather than a sequential read, causing a performance drop, although the original read commands are sequential.

Figure 3:
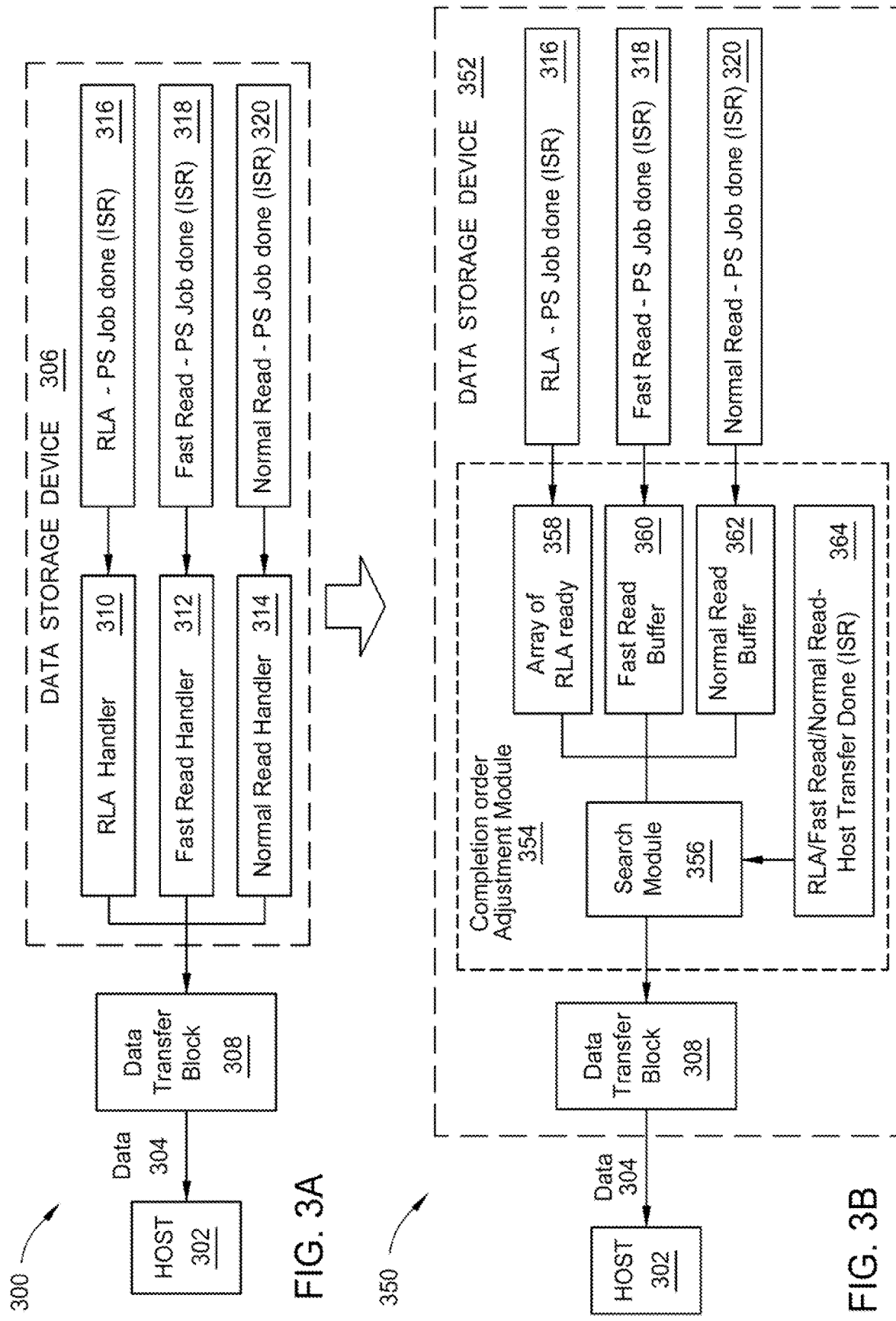
FIG. 3A depicts a first schematic block diagram illustrating a data storage device using a conventional approach to handling read commands, according to certain embodiments.
FIG. 3B depicts a second schematic block diagram illustrating a data storage device using a completion order adjustment module to handle an ordering of read commands, according to certain embodiments.
Figure 4:
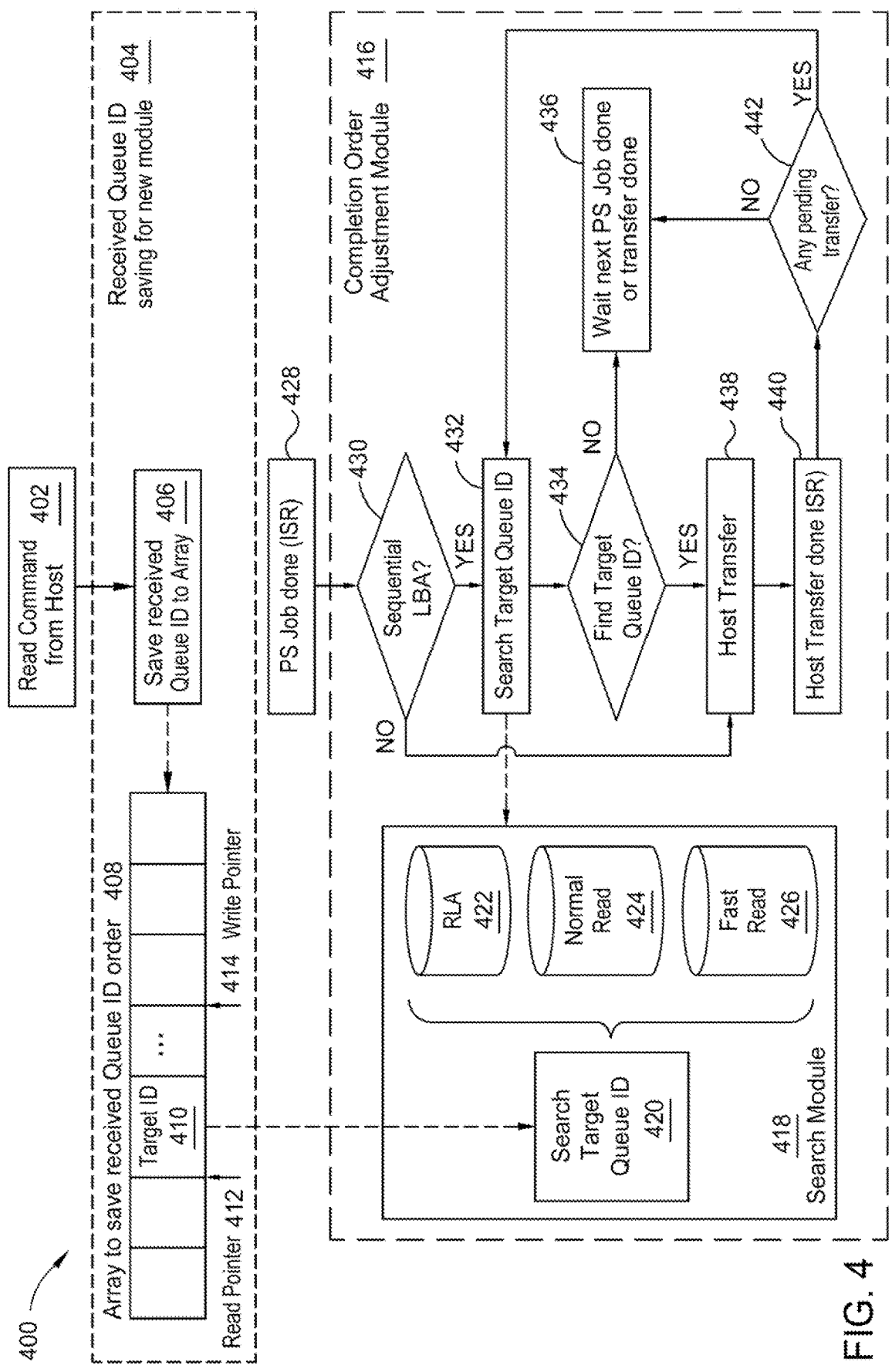
FIG. 4 depicts a schematic block diagram illustrating operations of a completion order adjustment module, according to certain embodiments.

FIG. 4 depicts a schematic block diagram 400 illustrating operations of a completion order adjustment module 416, according to certain embodiments. The schematic block diagram 400 includes a received queue ID saving for new module 404 and the completion order adjustment module 416. At block 402, a read command from a host, such as the host 202 of FIG. 2, is received by the received queue ID saving for new module 404. At block 406, the queue ID is saved to an array, such as an array to save received queue ID order 408. The array to save received queue ID order 408 may be the array of RLA ready 358 of FIG. 3. In some examples, the array may be stored in either an internal DRAM, volatile memory or non-volatile memory of the storage device. In another example, the array may be stored in either a host memory buffer or a controller memory buffer. The array to save received queue ID order 408 may be located in the completion order adjustment module 416, in some embodiments, and includes a read pointer 412 to determine the current location of a read and a write pointer 414 to determine the next location for a write to the array to save received queue ID order 408.

When a read module, such as either the RLA 212, the normal read 214, or the fast read 216, posts a PS job done (ISR) at block 428, the completion order adjustment module 416 determines if the processed commands have a sequential LBA order at block 430. If the processed commands do not have a sequential LBA, such that the LBAs are random, the data is transmitted to a host device, such as the host device 302 of FIG. 3, at block 438. However, if the processed commands do have a continuous, sequential LBA at block 430, then at block 432, the completion order adjustment module 416 searches for the target queue ID. A search module 418 executes the search for the target queue ID at block 432. The search module 418 may be the search module 356 of FIG. 3. A target ID 410 corresponding to the search for the target queue ID at block 432 is retrieved by the search module 418. The target ID 410 corresponds with a queue ID of a processed command located in either an RLA location 422, a normal read location 424, or a fast read location 426. The RLA location 422, the normal read location 424, and the fast read location 426 may be the array of RLA ready 358, the normal read buffer 362, and the normal read buffer 360 of FIG. 3, respectively.

At block 434, the completion order adjustment module 416 determines if the target queue ID has been found. If the target queue ID has not been found at block 434, the completion order adjustment module 416 waits for the next PS job to complete or another data transfer to complete at block 436. However, if the target queue ID is found at block 434, the completion order adjustment module sends the data to the host device 302 at block 438. At block 440, a host transfer done (ISR) is generated. The host transfer done (ISR) is sent to the host device 302. At block 442, the completion order adjustment module 416 determines if there are any pending transfers remaining. If there are none, the process advances to block 436; else the process advances to block 432.

Figure 5:
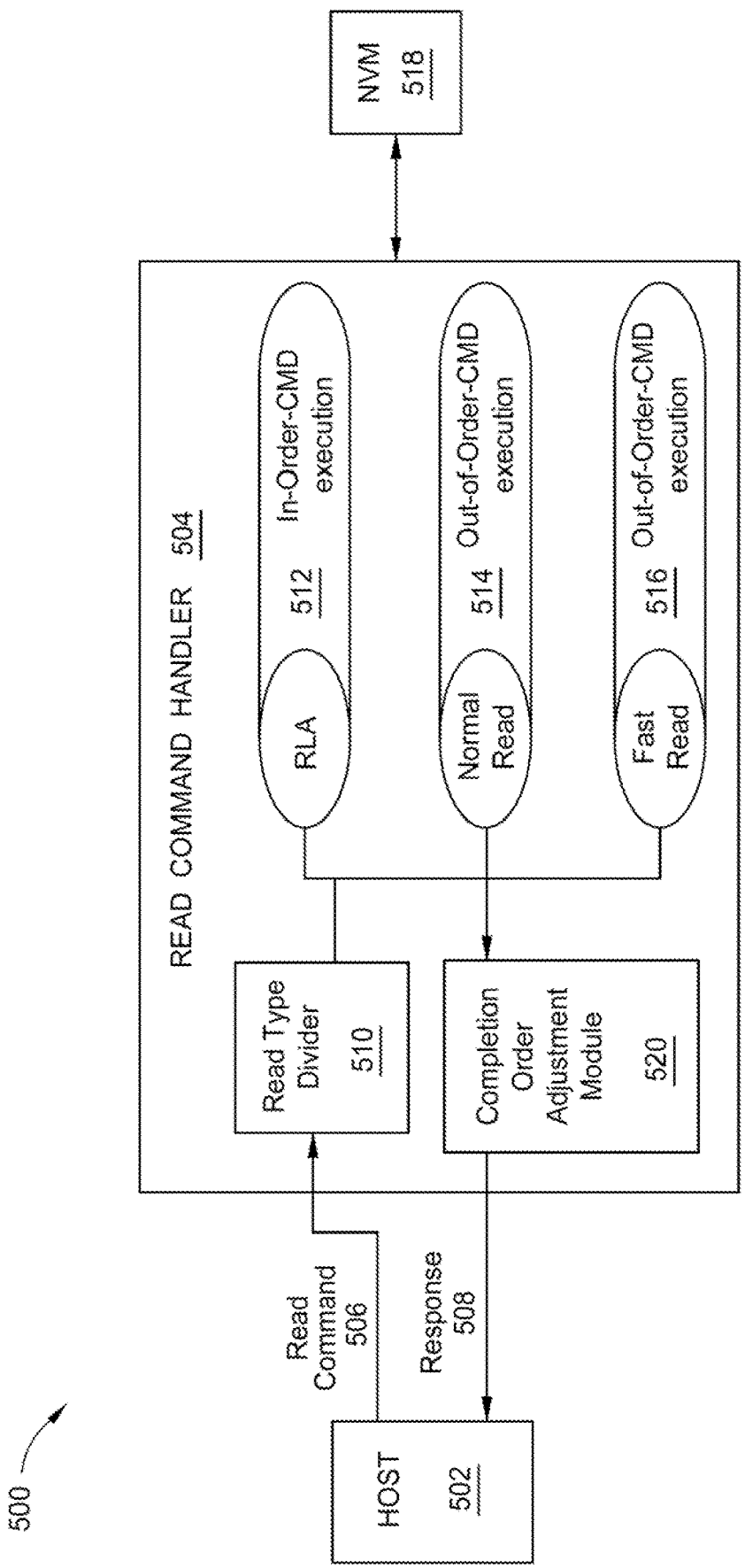
FIG. 5 depicts a schematic block diagram illustrating a read command handler including a completion order adjustment module interacting with a host device and an NVM, according to certain embodiments.

FIG. 5 depicts a schematic block diagram 500 illustrating a read command handler 504, including a completion order adjustment module 520 interacting with a host device 502 and an NVM 518, according to certain embodiments. The schematic block diagram 500 is the schematic block diagram 200 with an addition of the completion order adjustment module 520. For example, a host device 502 is the host device 202, an ingress bus 506 is the ingress bus 206, an egress bus 508 is the egress bus 206, a read type divider 510 is the read type divider 210, and an NVM 518 is the NVM 218.

The completion order adjustment module 520 may be the completion order adjustment module 416 of FIG. 4 and/or the completion order adjustment module 354 of FIG. 3. The completion order adjustment module 520 receives processed commands from the RLA 512, the normal read 514, and the fast read 516. The completion order adjustment module 520 reorders the processed commands in order to maintain a sequential read order when sending the processed commands back to the host device 502.

Figure 6C:
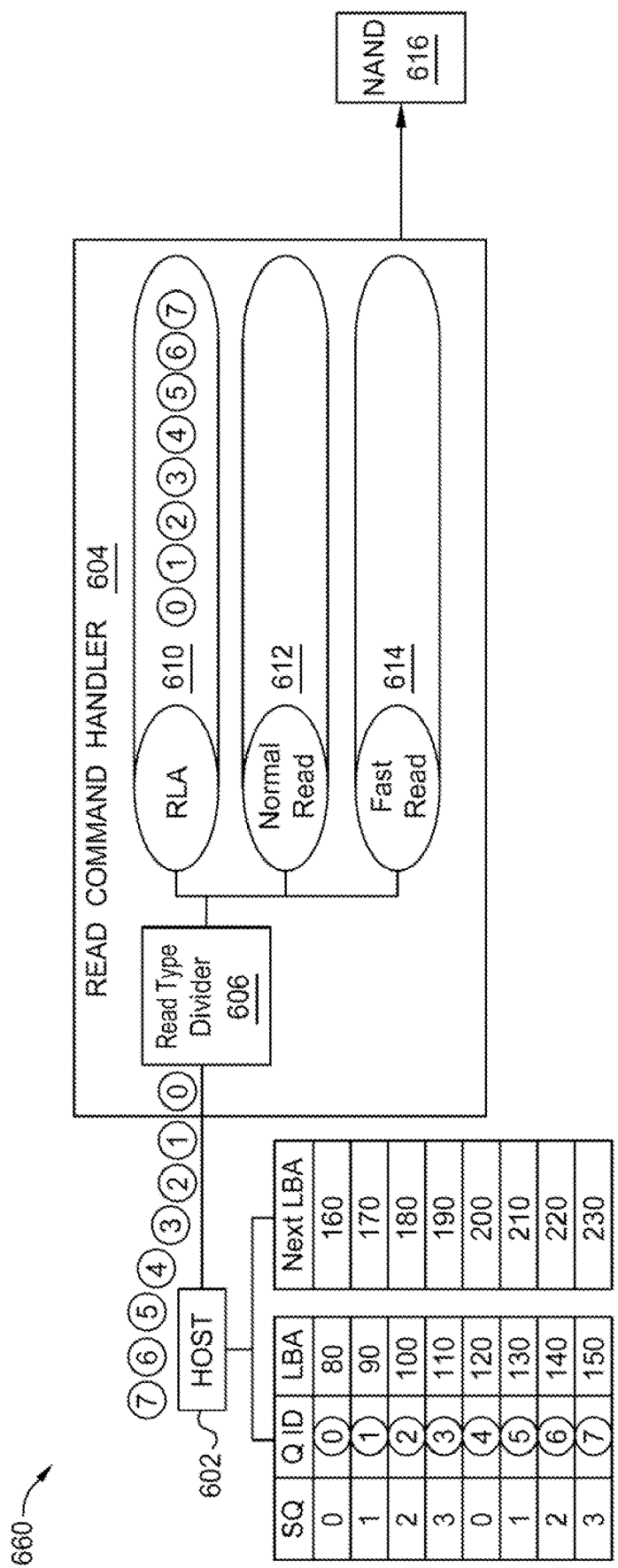

FIGS. 6A-6C depict a read command handler 604 generating a sequential read flow, according to certain embodiments. The read command handler 604 receives a plurality of read commands along with a respective queue ID from a host device 602. The read commands and queue IDs are received at a read type divider 606. Based on the read type of the read commands, the plurality of read commands are categorized as either an RLA 610, a normal read 612, or a fast read 614. The commands of each read type are processed and executed to a respective location in an NVM 616. A processed command is generated for each of the commands processed and is sent back to the respective read type location. The processed commands along with queue ID are retrieved by a completion order adjustment module 608, where the completion order adjustment module reorders the processed commands based on a sequential sequence. The completion order adjustment module 608 sends the sequentially processed command along with the respective queue IDs back to the host device 602.

Referring to FIG. 6A, the host device 602 has a submission queue (SQ), including a plurality of commands with a respective queue ID, 0-7, and an associated LBA with each queue ID. The host device 602 sends the plurality of commands to a data storage device, such as the data storage device 106 of FIG. 1, where the read type divider 606 receives the plurality of commands. The read type divider 606 sorts the plurality of commands into the respective read type (i.e., RLA 610, normal read 612, or fast read 614). Although the LBA is continuous, it is processed as a Fast read because of the condition that the LBAs of three or more commands must be continuous in order to judge as RLA. The commands with the queue ID 0, 1, and 2 are placed in the fast read 614, and the commands with the queue ID 3, 4, 5, 6, and 7 are placed in the RLA 610. The commands are then processed in order from fast read 614 to the RLA 610.

Referring to FIG. 6B, the commands of the fast read 614 may be processed out-of-order such that the generated processed commands are returned in the order of 1, 0, 2. The generated processed commands associated with the RLA 610 are returned in the same order that the commands were executed due to the sequential, in order execution of the RLA 610 commands. The processed commands are sent to the completion order adjustment module 608 in the order of 1, 0, 2, 3, 4, 5, 6, and 7 indicating that the commands were not processed in order (i.e., the commands of the fast read 614).

The completion order adjustment module 608 utilizes a reordering technique to reorder the out-of-order processed commands such that the commands are sent back to the host device in the order of 0, 1, 2, 3, 4, 5, 6, and 7. The reordering technique maybe the described in the descriptions of FIG. 3 and FIG. 4. The processed commands, along with the respective queue IDs, are stored in order in the host device 602.

Referring to FIG. 6C, when the host device 602 transmits the commands along with the respective queue IDs back to the data storage device 106, the commands and the queue IDs are sequential and are processed by the RLA 610. Thus, the commands are processed in the original sequence and may be executed sequentially.

Figure 7:
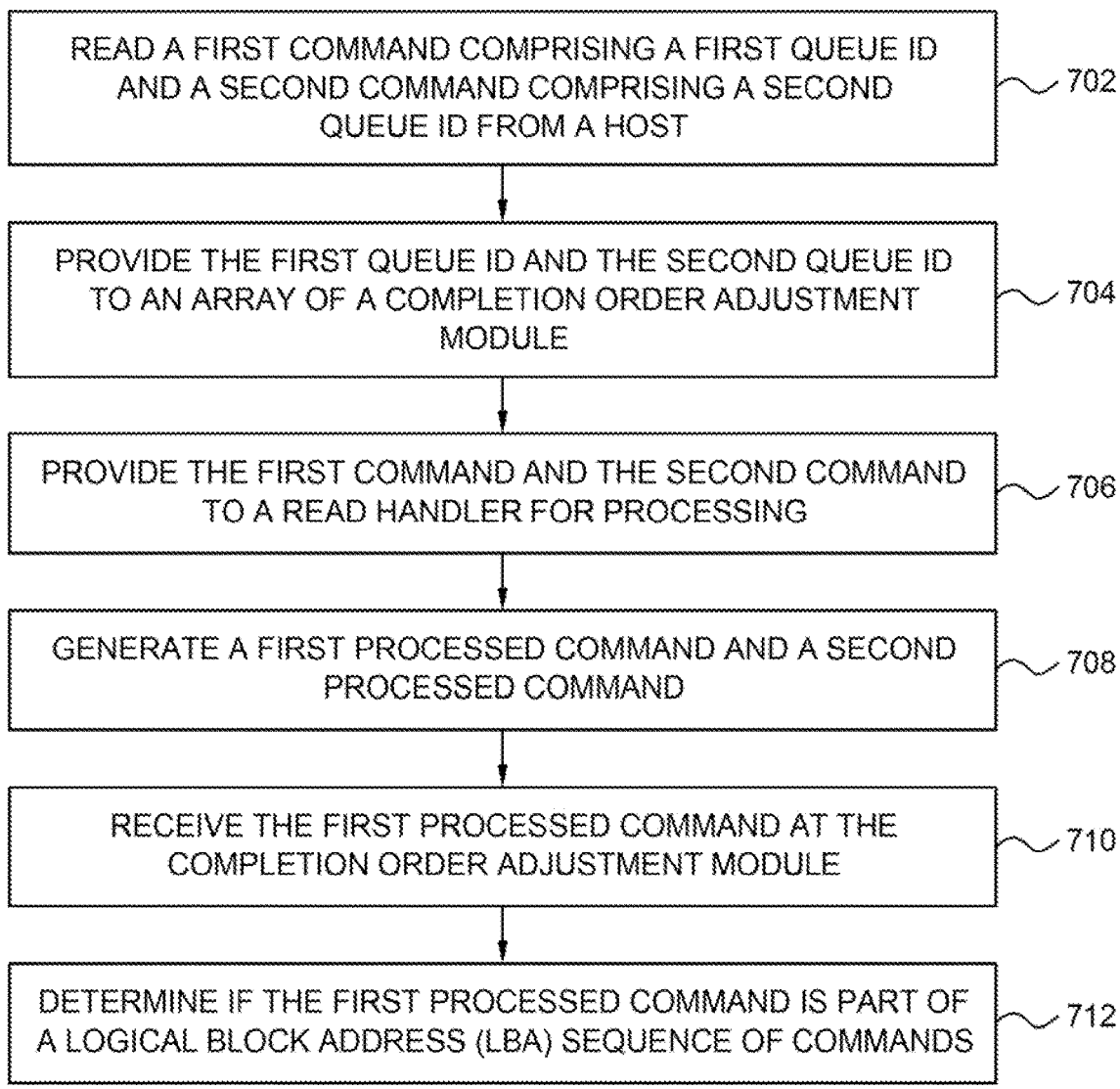
FIG. 7 depicts a flow diagram illustrating a method of command queue order adjustment, according to certain embodiments.

FIG. 7 depicts a flow diagram 700 illustrating a method of command queue order adjustment, according to certain embodiments. At block 702, a controller, such as the controller 108 of FIG. 1, reads a first command including a first queue ID and a second command including a second queue ID from a host device, such as the host device 104 of FIG. 1. At block 704, the controller 108 provides the first queue ID and the second queue ID to an array of a completion order adjustment module. The array may be the array to save received queue ID order 408 of FIG. 4, and the completion order adjustment module may be the completion order adjustment order module 354 of FIG. 3. At block 706, the first command and the second command are provided to a read command handler, such as the read command handler 604 of FIGS. 6A-6C, for processing. The processing may including sorting the first command and the second command by a read type and executing the commands in the order of the read type.

At block 708, a first processed command associated with the first command and a second processed command associated with the second command is generated. At block 710, the completion order adjustment module 354 receives the first processed command. At block 712, the completion order adjustment module 354 determines if the first processed command is part of an LBA sequence of commands (i.e., if the first processed command is in sequence or out-of-sequence with the LBAs). In some examples, the first processed command is not transferred to the host device 104 until the second command is generated and determined to be part of the LBA sequence of commands.

By reordering processed commands to be in sequential order rather than in a non-sequential order prior to providing the processed commands to a host device, the sequential read performance of the data storage device may be maintained, such that the performance of the data storage device is improved.

In one embodiment, a data storage device includes a controller including computer-readable instructions that when executed by the controller, cause the controller to execute a method for command queue order adjustment that includes read a first command comprising a first queue ID and a second command comprising a second queue ID from a host, providing the first queue ID and second queue ID to an array of a completion order adjustment module, provide the first command and second command to a command handler for processing, and generate a first processed command and second processed command. The method further includes receive the first processed command at the completion order adjustment module, and determine if the first processed command is part of a logical block address (LBA) sequence of commands.

The computer-readable instructions further causes the controller to, responsive to determining if the first processed command is part of the logical block address (LBA) sequence of commands includes the second command, determining that the first processed command is part of the LBA sequence of commands. The computer-readable instructions further causes the controller to search the array for the second queue ID. The computer-readable instructions further causes the controller to pause the transmission of the first processed command to the host until the second queue ID is found in the array. The computer-readable instructions further causes the controller to provide the first processed command and the second processed command to the host. The computer-readable instructions further causes the controller to, responsive to determining if the first processed command is part of the logical block address (LBA) sequence of commands, determining that the first processed command is not part of the LBA sequence of commands. The computer-readable instructions further causes the controller to provide the first processed command to the host.

In another embodiment, a controller for a data storage device that includes an I/O to one or more memory devices comprising computer-readable instructions, and a processor coupled to the one or more memory devices configured to execute the computer-readable instructions and cause the controller to perform a method for command queue order adjustment in a data storage device. According to certain embodiments, the method includes receive a first completed command having a first queue ID and a second completed command having a second queue ID at a completion order adjustment module comprising a search module, and determine if the first completed command and second completed command are sequential commands.

The computer-readable instructions further cause the controller to, responsive to the determine if the first completed command and second completed command are sequential commands, determine that the first completed command and second completed command are sequential commands. The computer-readable instructions further cause the controller to search a data structure for the second queue ID, using the search module. The computer-readable instructions further cause the controller to pause transfer of the first command to the host until the second command is processed. The computer-readable instructions further cause the controller to transfer the first completed command and the second completed command to the host. The computer-readable instructions further cause the controller to, responsive to the determine if the first completed command and second completed command are sequential commands, that the first completed command and second completed command are not sequential commands. The computer-readable instructions further cause the controller to transfer the first completed command to the host.

In another embodiment, a system for storing data is disclosed that includes one or more memory means, and a controller means configured to perform a method for command queue order adjustment in a data storage device. The method includes provide a first queue ID of a first command and a second queue ID of a second command to a searchable data structure, determine if the first command and second command are sequential commands, and transfer the first command to a host.

The controller means further configured to, responsive to determine if the first command and second command are sequential commands, determine that the first command and second command are not sequential commands. The controller means further configured to, responsive to determine if the first command and second command are sequential commands, determine that the first and second command are sequential commands. The controller means further configured to search the searchable data structure for the second queue ID. The controller means further configured to, responsive to search the searchable data structure for the second queue ID, find the second queue ID in the searchable data structure, and provide the second queue ID to the host. The controller means further configured to, responsive to search the searchable data structure for the second queue ID, not find the second queue ID in the searchable data structure, wait for the second queue ID to be present in the searchable data structure, and provide the second queue ID to the host.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
   a controller comprising computer-readable instructions that when executed by the controller, cause the controller to execute a method for command queue order adjustment, the method comprising:
   read a first command comprising a first queue ID and a second command comprising a second queue ID from a host;
   provide the first queue ID and the second queue ID to an array of a completion order adjustment module;
   store the first queue ID and the second queue ID in the array;
   provide the first command and the second command to a command handler for processing;
   generate a first processed command and a second processed command, wherein the first processed command and the second processed command are processed in an order of a fast read to a read look ahead (RLA);
   receive the first processed command at the completion order adjustment module;
   determine if the first processed command is part of a logical block address (LBA) sequence of commands;
   search the array for other commands of the sequence of commands;
   wait to transfer until each command of the sequence of commands is found;
   reorder the first queue ID and the second queue ID such that the first processed command comprising the first queue ID is sent to a host before the second processed command comprising the second queue ID is sent to the host;
   transfer data associated with each command of the sequence of commands to the host;
   generate a host transfer done interrupt service routine (ISR) and then check for any pending transfers; and
   search a target queue ID when there are pending transfers, wherein the searching comprises using a search module to search a RLA location, a normal read location, and a fast read location, wherein the RLA location, the normal read location, and the fast read location are separate and distinct locations within the search module.

2. The data storage device of claim 1, wherein determining if the first processed command is part of the logical block address (LBA) sequence of commands comprises determining that the first processed command is part of LBA sequence of commands.

3. The data storage device of claim 2, wherein the computer-readable instructions further cause the controller to search the array for the second queue ID.

4. The data storage device of claim 3, wherein the computer-readable instructions further cause the controller to provide the first processed command and second processed command to the host.

5. The data storage device of claim 2, wherein the computer-readable instructions further cause the controller to pause transmission of the first processed command to the host until the second queue ID is found in the array.

6. The data storage device of claim 1, wherein determining if the first processed command is part of the logical block address (LBA) sequence of commands comprises determining that the first processed command is not part of the LBA sequence of commands.

7. The data storage device of claim 6, the computer-readable instructions further cause the controller to provide the first processed command to the host.

8. A controller for a data storage device, comprising:
one or more memory devices comprising computer-readable instructions;
a processor coupled to the one or more memory devices configured to execute the computer-readable instructions and cause the controller to perform a method for command queue order adjustment in a data storage device, the method comprising:
receive a first command having a first queue ID and a second command having a second queue ID at a completion order adjustment module comprising a search;
store the first queue ID and the second queue ID in an array;
generate a first processed command and a second processed command, wherein the first processed command and the second processed command are processed in an order of a fast read to a read look ahead (RLA);
determine if the first processed command and second processed command are sequential commands;
search the array for other commands of the sequential commands;
wait to transfer until each command of a LBA sequence of commands is found;
reorder the first queue ID and the second queue ID such that the first processed command comprising the first queue ID is to be sent to a host before the second processed command comprising the second queue ID is sent to the host;
transfer data for each command of the sequence of commands to the host;
generate a host transfer done interrupt service routine (ISR) and then check for any pending transfers; and
search a target queue ID when there are pending transfers, wherein the searching comprises using a search module to search a RLA location, a normal read location, and a fast read location, wherein the RLA location, the normal read location, and the fast read location are separate and distinct locations within the search module.

9. The controller of claim 8, wherein determining if the first processed command and second processed command are sequential commands comprises determining that the first command and second command are sequential commands.

10. The controller of claim 9, wherein the computer-readable instructions further cause the controller to search a data structure for the second queue ID, using the search module.

11. The controller of claim 10, wherein the computer-readable instructions further cause the controller to pause transfer of the first processed command to the host until a second received command is processed.

12. The controller of claim 10, wherein the computer-readable instructions further cause the controller to transfer the first processed command and the second processed command to a host.

13. The controller of claim 8, wherein determining if the first processed command and second processed command are sequential commands comprises determining that the first command and second command are not sequential commands.

14. The controller of claim 13, wherein the computer-readable instructions further cause the controller to transfer the first processed command to a host.

15. A system for storing data, comprising:
means for storing data; and
a controller configured to perform a method for command queue order adjustment in a data storage device, the method comprising:
provide a first queue ID of a first command and a second queue ID of a second command to a searchable data structure;
store the first queue ID and the second queue ID in an array;
generate a first processed command and a second processed command, wherein the first processed command and the second processed command are processed in an order of a fast read to a read look ahead (RLA);
determine if the first processed command and second processed command are sequential commands;
search the array for other commands of the sequential commands;
wait to transfer until each command of a LBA sequence of commands is found;
reorder the first queue ID and the second queue ID such that the first processed command comprising the first queue ID is to be sent to a host before the second processed command comprising the second queue ID is sent to the host;
transfer the first processed command to the host;
transfer data for each command of the sequence of commands to the host;
generate a host transfer done interrupt service routine (ISR) and then check for any pending transfers; and
search a target queue ID when there are pending transfers, wherein the searching comprises using a search module to search a RLA location, a normal read location, and a fast read location, wherein the RLA location, the normal read location, and the fast read location are separate and distinct locations within the search module.

16. The system of claim 15, wherein determining if the first processed command and second processed command are sequential commands comprises determining that the first processed command and second processed command are not sequential commands.

17. The system of claim 15, wherein determining if the first processed command and second processed command are sequential commands comprises determining that the first and second processed command are sequential commands.

18. The system of claim 17, wherein the controller is further configured to, search the searchable data structure for the second queue ID.

19. The system of claim 18, wherein the controller is further configured to, responsive to search the searchable data structure for the second queue ID, find the second queue ID in the searchable data structure and provide the second queue ID to the host.

20. The system of claim 18, wherein the controller is further configured to, responsive to search the searchable data structure for the second queue ID, not find the second queue ID in the searchable data structure, wait for the second queue ID to be present in the searchable data structure, and provide the second queue ID to the host.

\* \* \* \* \*